J. F. KIELY.
TIME RECORDER.
APPLICATION FILED JULY 6, 1910.
1,087,665.
Patented Feb. 17, 1914.
9 SHEETS—SHEET 1.
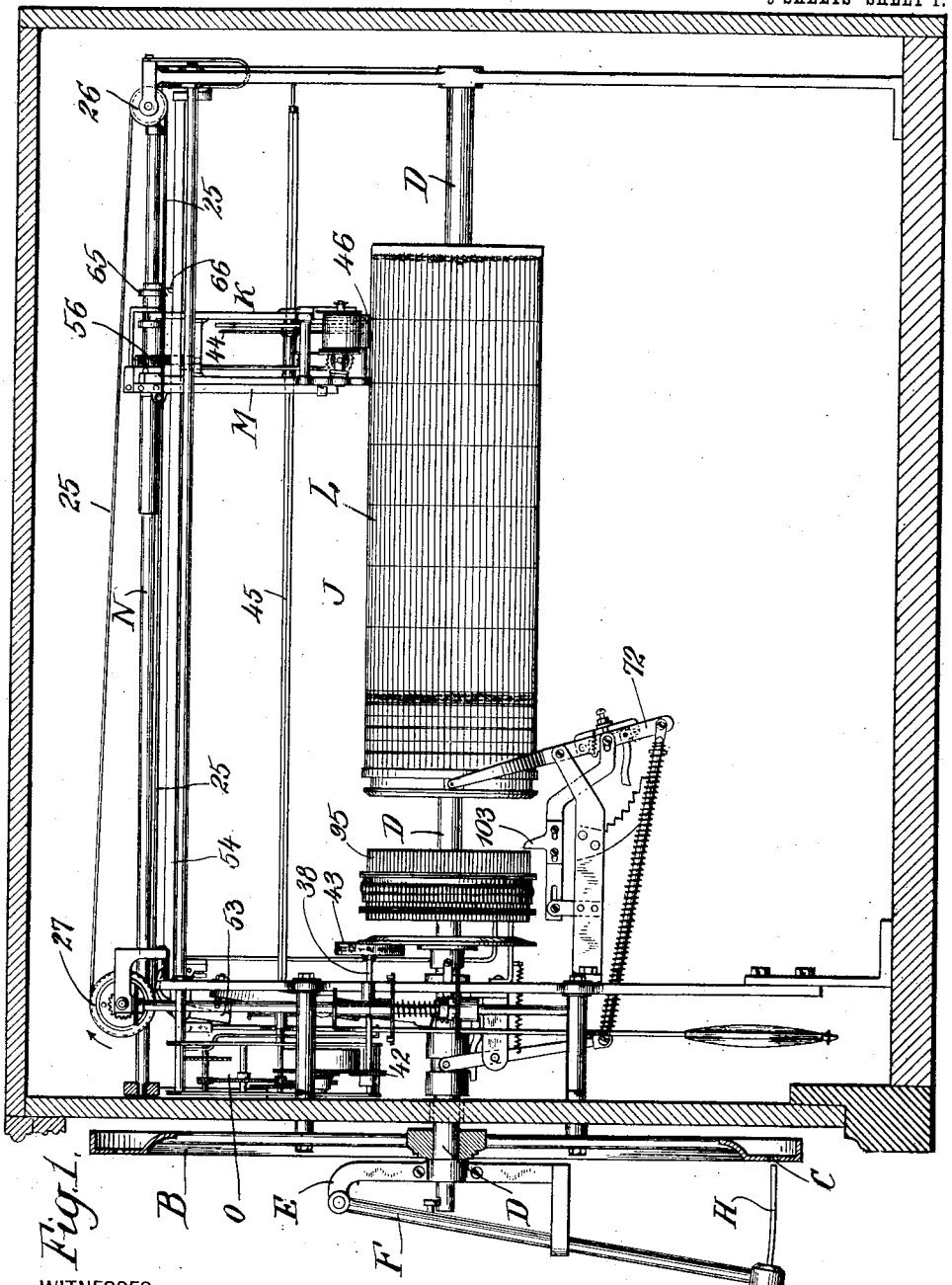
WITNESSES:
Harry Goss
S. S. Dunham.
INVENTOR
J. F. Kiely
BY Kerr, Page, Cooper & Hayward
ATTORNEYS J. F. KIELY.
TIME RECORDER.
APPLICATION FILED JULY 6, 1910.
1,087,665.
Patented Feb. 17, 1914.
9 SHEETS—SHEET 2.
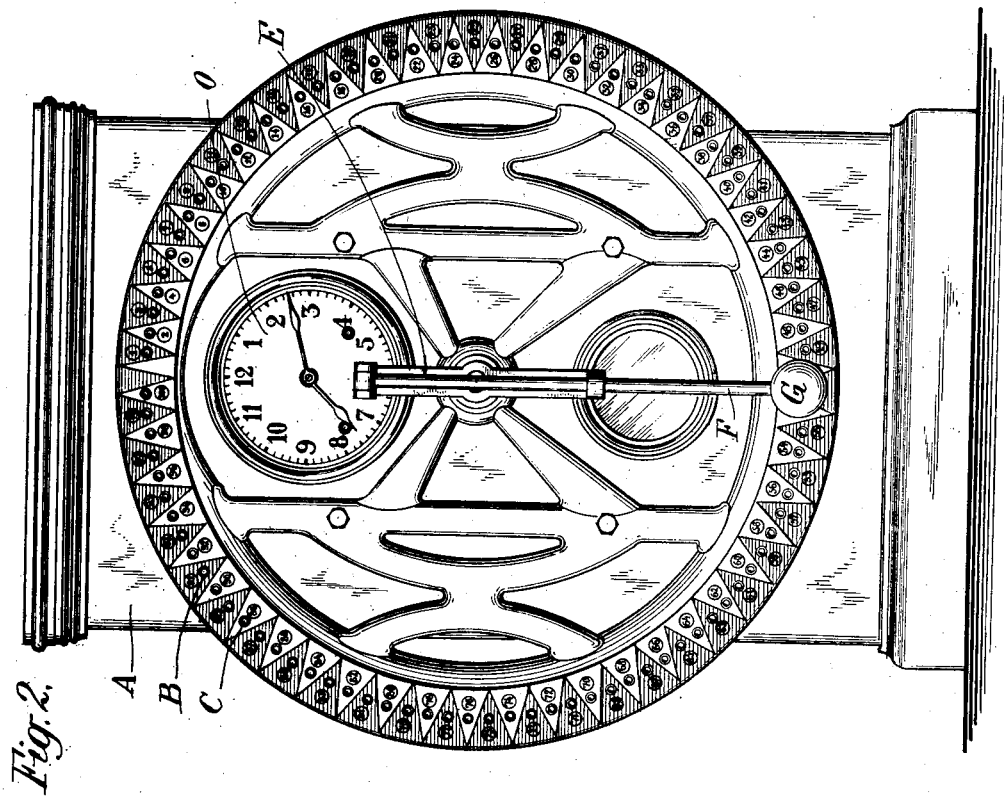
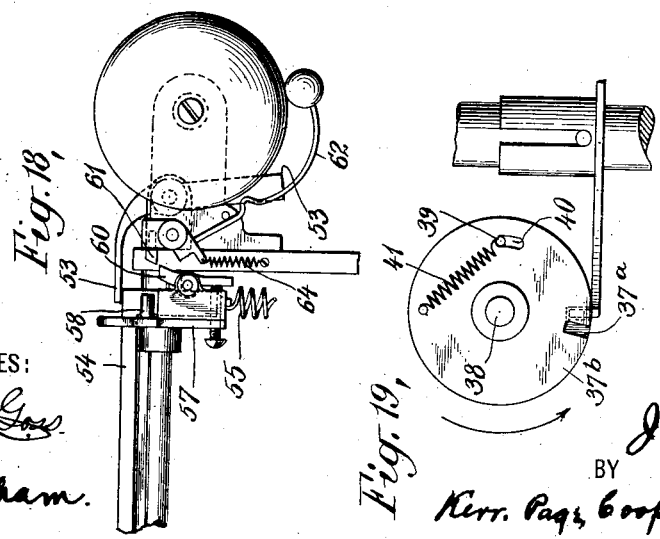
WITNESSES:
INVENTOR
J. F. Kiely
BY
Kerr, Page, Cooper & Hayward
ATTORNEYS

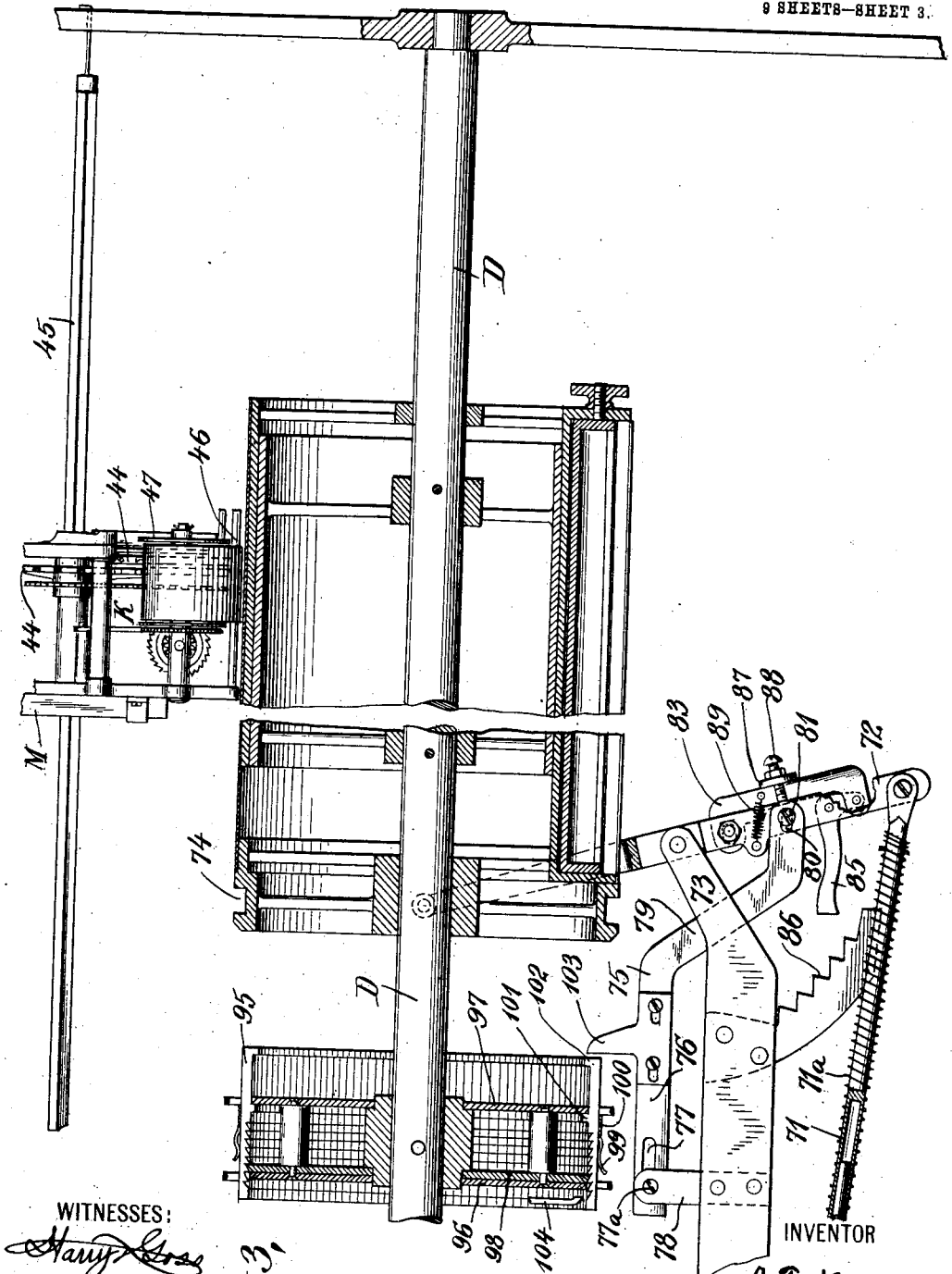

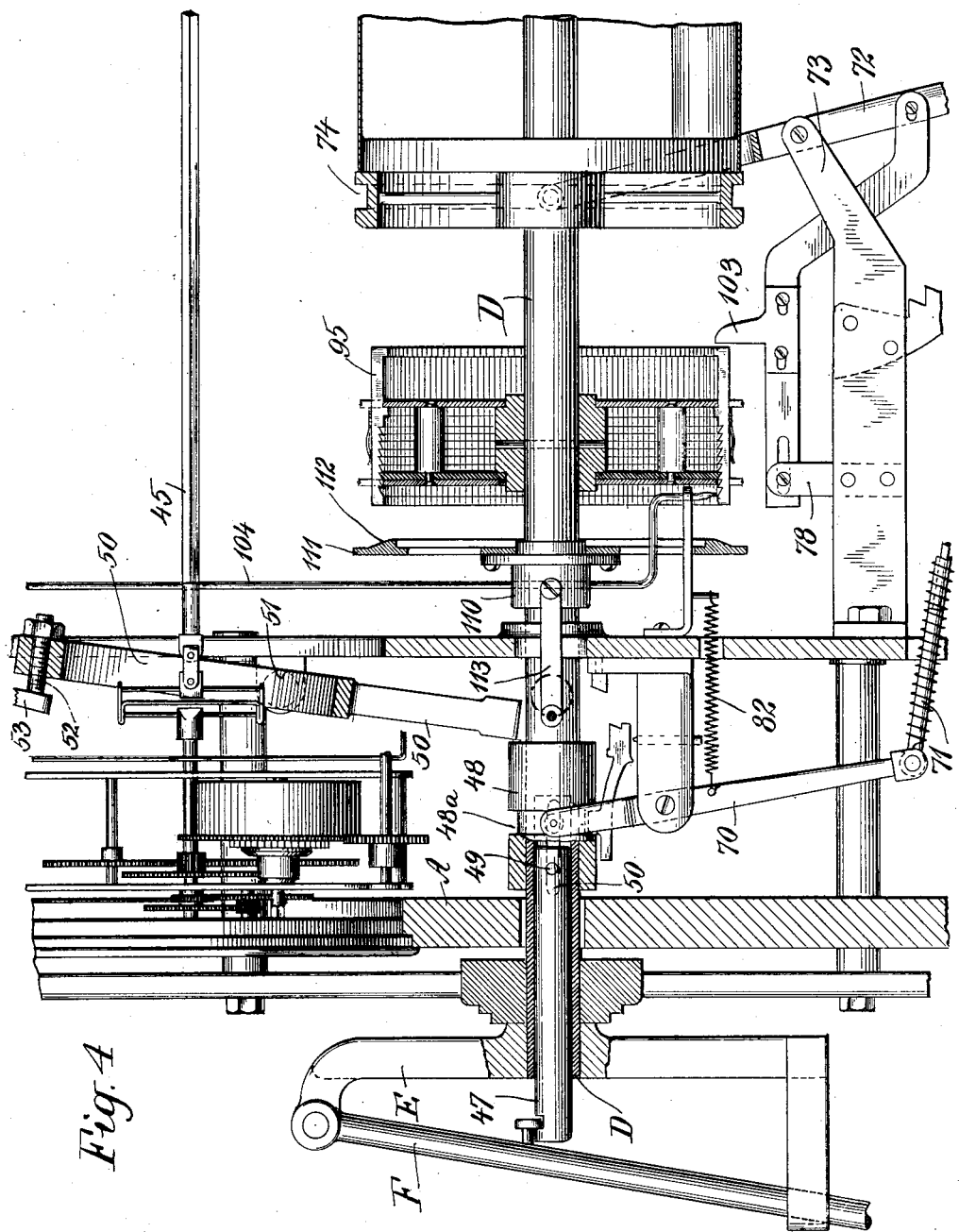

J. F. KIELY.
TIME RECORDER.
APPLICATION FILED JULY 6, 1910.
1,087,665.
Patented Feb. 17, 1914.
9 SHEETS—SHEET 5.
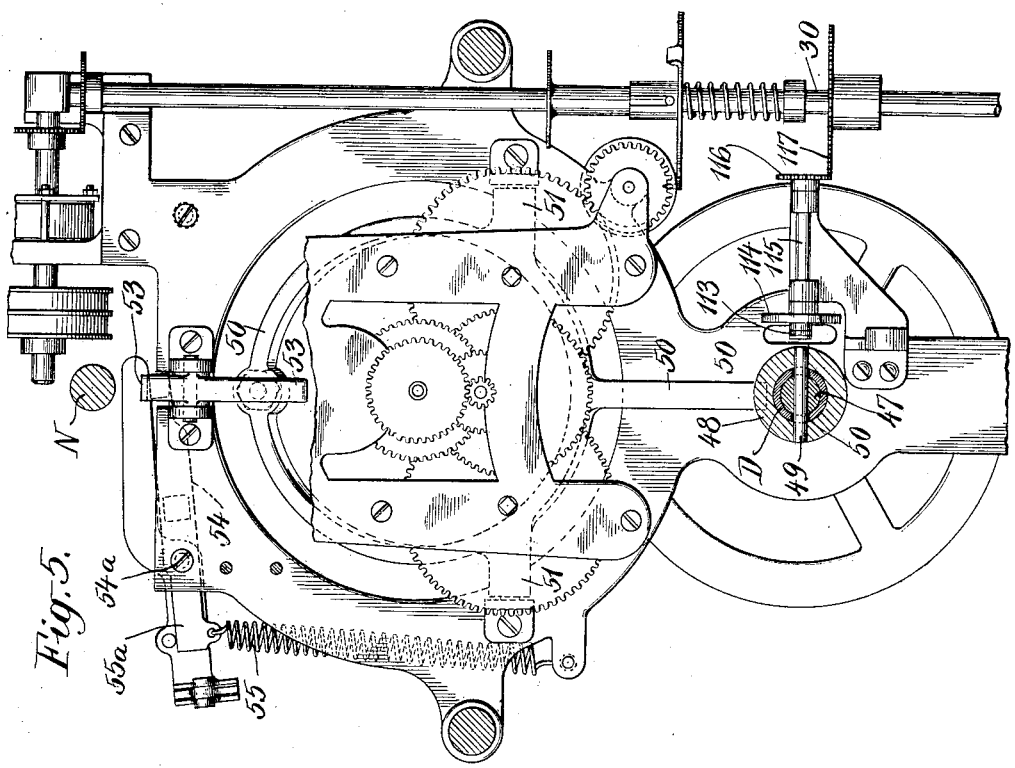
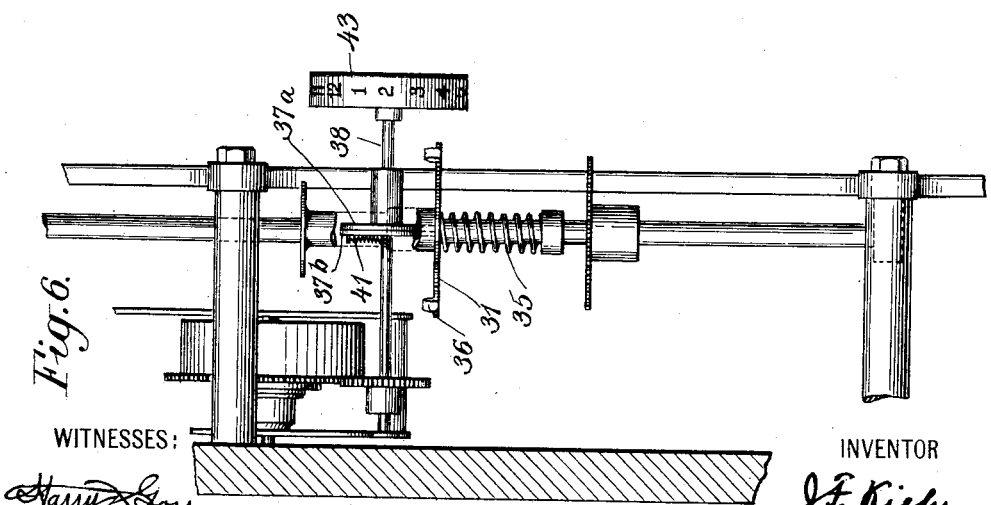

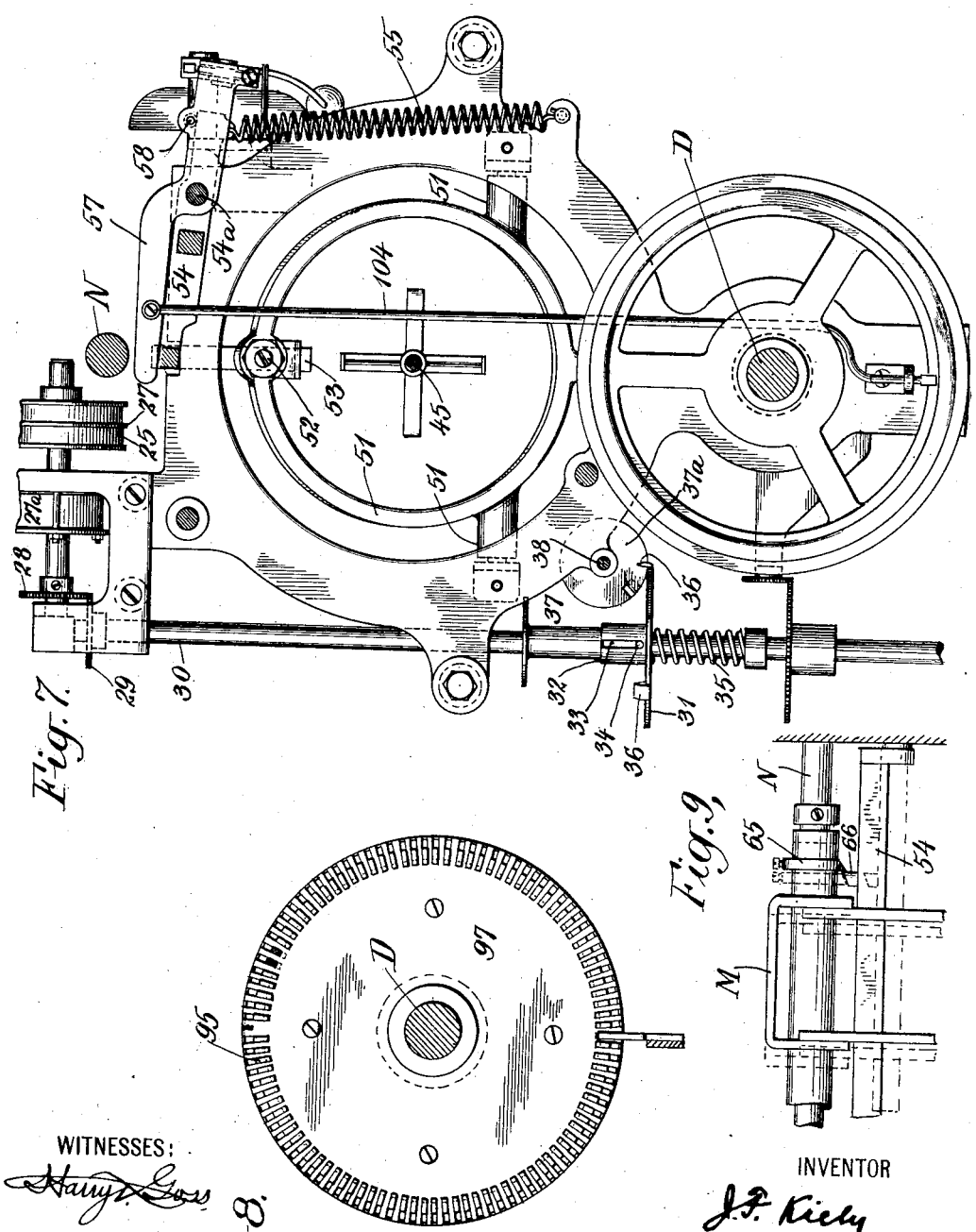

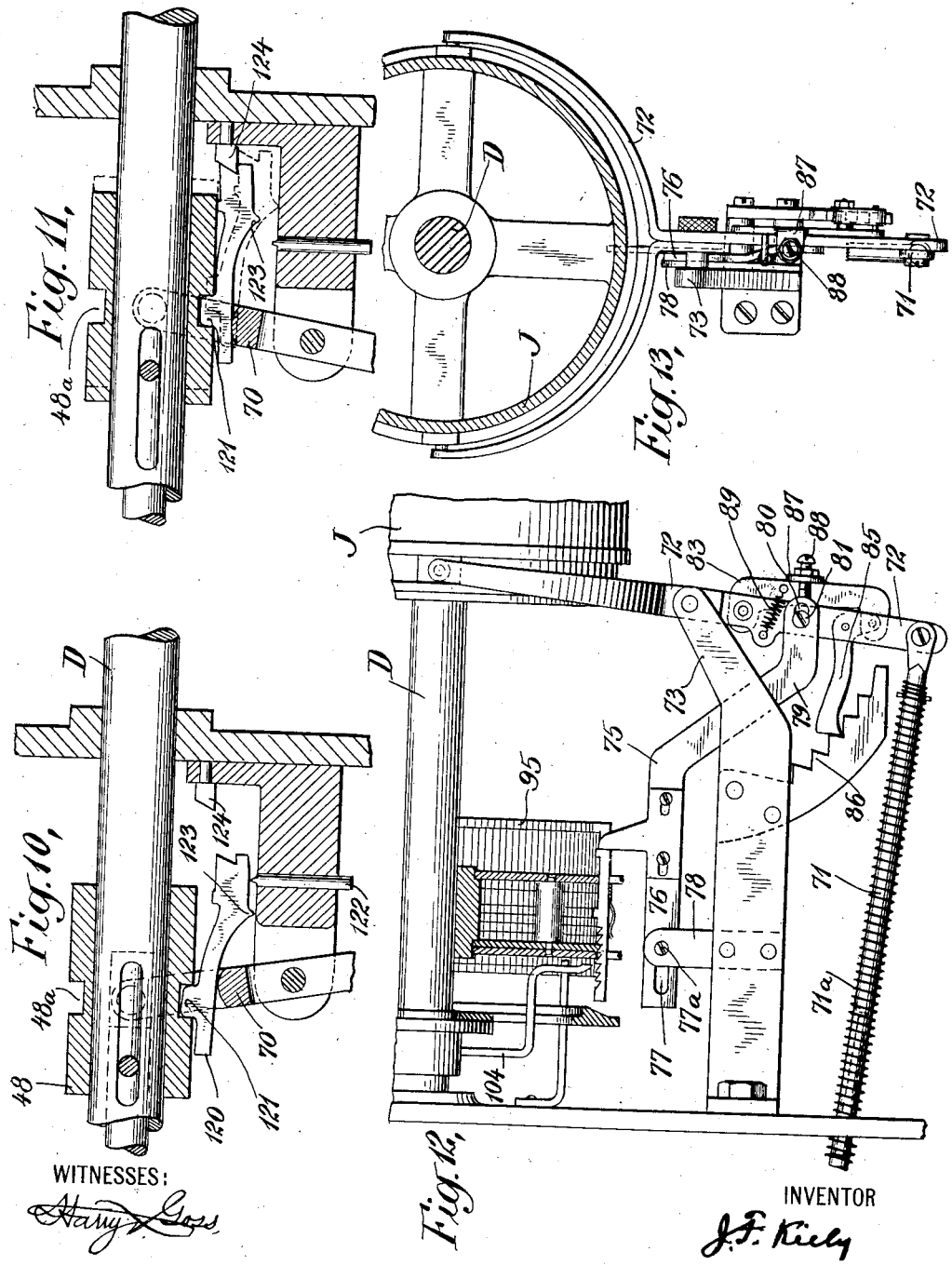

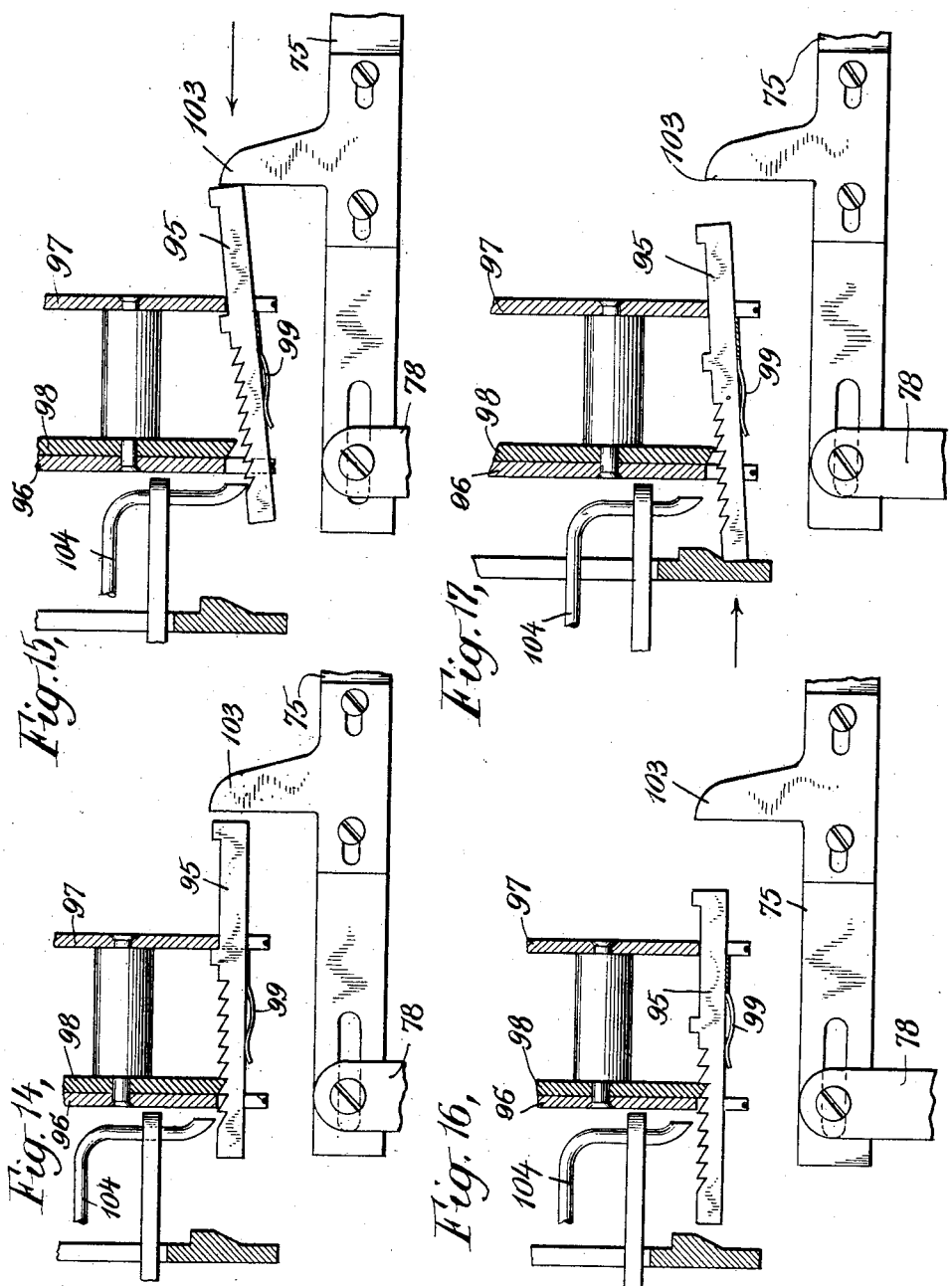

J. F. KIELY.
TIME RECORDER.
APPLICATION FILED JULY 6, 1910.
1,087,665.
Patented Feb. 17, 1914.
9 SHEETS—SHEET 9.
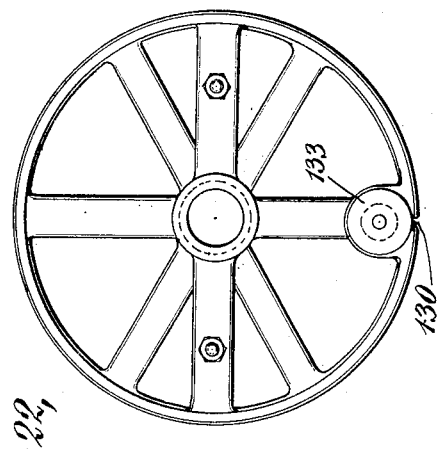
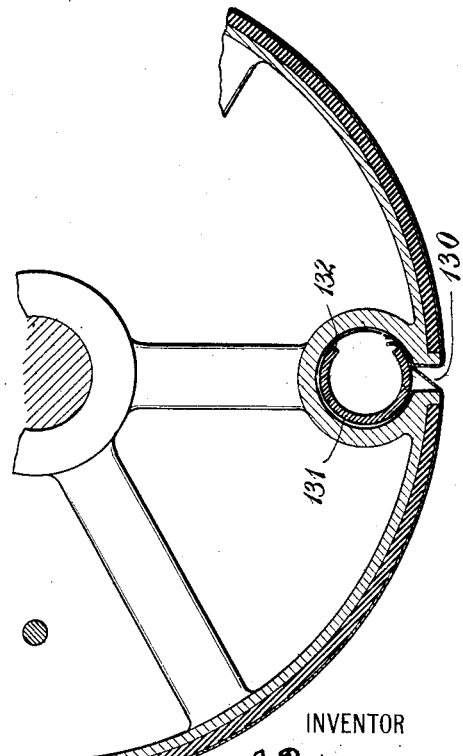
WITNESSES:
INVENTOR
BY
ATTORNEYS

UNITED STATES PATENT OFFICE.

JAMES F. KIELY, OF SYRACUSE, NEW YORK.

TIME-RECORDER.

1,087,665.

Specification of Letters Patent.

Patented Feb. 17, 1914.

Application filed July 6, 1910. Serial No. 570,538.

*To all whom it may concern:*

Be it known that I, JAMES F. KIELY, a citizen of the United States, residing at Syracuse, in the county of Onondaga and State of New York, have invented certain new and useful Improvements in Time-Recorders, of which the following is a full, clear, and exact description.

This invention relates to time-recorders, more particularly to the mechanism for effecting a relative movement of adjustment between the printing instrumentalities, and its chief object is to provide improved means whereby after a workman has made his first registration on any day each succeeding actuation of the machine by the same workman on the same day will produce a preliminary adjustment of the printing instrumentalities to bring a fresh space to the impression point.

A further object is to provide means whereby a second imprint cannot be made on any space already printed, thus avoiding the making of illegible imprints by accident, or with fraudulent intent on the part of a workman to obliterate or render illegible an imprint indicating a late arrival or early departure.

To these and other ends the invention consists in the novel features of construction and combinations of elements hereinafter described, and more particularly set forth in the appended claims.

While the invention is capable of employment with time-recorders of various types I have selected for illustration and specific description herein its embodiment in a recorder of the so-called dial type, as exhibiting the various features of the invention in convenient and effective form.

Referring now to the accompanying drawings, in which the embodiment mentioned is shown, Figure 1 is a side view of the complete apparatus, with the outer casing and dial in vertical section. Fig. 2 is a front view of the machine, showing the dial bearing the workmen's numbers, and the manual operating lever which is actuated to produce the time records. Fig. 3 is a detail sectional view, on a larger scale, showing the mechanism immediately coöperating with the impression cylinder or drum to effect the preliminary shifting or adjustment of the same with respect to the time printing wheel or wheels. Fig. 4 is a similar view of the same mechanism, with other coöperating parts.

Figs. 5, 6, and 7 are detail views of the time controlled mechanism for shifting the typewheel carriage from day to day. Fig. 8 is a rear view of the crown of ratchet pins employed to limit the movement of the impression drum. Fig. 9 is a detail view of the devices employed in connection with the machine when but six day-spaces are provided for, to prevent shifting of the type-wheel carriage between Saturday night and Monday night. Figs. 10 and 11 are detail views showing different operative positions of the devices employed to prevent too vigorous actuation of the machine, such as might cause injury thereto. Fig. 12 is a detail side view, partly in section, of the mechanism shown in Fig. 3, but in a different operative position. Fig. 13 is a rear view of the parts shown in Fig. 12. Figs. 14, 15, 16, and 17 are detail views showing different operative positions of one of the ratchet pins which serve to limit the preliminary adjustment or shifting of the impression drum or platen. Fig. 18 is a detail view of the gong or bell and the mechanism for sounding the same at each imprint. Fig. 19 is a detail view of the escapement device employed in connection with the mechanism for shifting the type-wheel carriage from day to day. Fig. 20 is a plan view of the record sheet used in the machine, showing a day's record. Fig. 21 is a detail cross section of the impression drum showing the means for securing the record sheet thereon. Fig. 22 is an end view of the complete drum with the record sheet in place.

The detailed construction and operation of the machine will be more readily understood if a brief description is first given of its more general features, with reference to Figs. 1 and 2. On the outside of the front end of the inclosing casing A is a dial B having at its periphery a circular series of apertures C of any suitable number, for example one hundred as in the machine illustrated. Each of these apertures is designated by a number, as shown, and to each workman a number is assigned. Journaled at center of the dial is a rotatable shaft D, and fixed to the shaft is an arm E at one end of which is pivoted an end of the printing lever F carrying at its outer end an operating knob G and a rearwardly extending pin or stem H in position to enter any of the apertures C. Now when a workman desires to register the time of his arrival or departure he first swings the printing lever around to his number on the dial. This movement of the lever rotates the rearwardly extending shaft D on which is mounted the impression drum J and brings to the impression point under the type-wheel or printing carriage K his own individual line on the record sheet L carried by the drum. Having thus brought the pin H into register with the aperture corresponding to his number, he next presses the pin into the aperture by pushing on the operating knob G. This movement of the lever causes the printing carriage to be depressed, bringing the time-printing devices into contact with the record sheet. Upon release of the knob the lever is thrown out to its normal position and the printing carriage is raised, leaving the parts in position for actuation by the next workman. As shown in Figs. 1 and 20 the record sheet is ruled in horizontal lines, one for each employee, and in wide vertical columns, seven in the present instance, one for the names of the employees and the rest for the six working days. On line 5, in the Monday column, (Fig. 20), is shown the day's time record of employee No. 5, from which it appears that on the day named he arrived at the factory or office at 7, went out for his noon meal at 12:10, returned to work at 12:50, and left for the day at 5:45. The printing carriage 20 is capable of horizontal movement, and for this purpose is slidably mounted in a frame M. The latter is slidably mounted on a horizontal rail N, from which said frame is hung, and suitable mechanism actuated by or under the control of the clock O is provided to shift the frame and carriage from day to day for the purpose of bringing the printing carriage over the next day-column on the record sheet. As will be noted from Fig. 20, the employee's arrival and departure records for a given day are printed in succession on the same horizontal line; and to effect this spacing, mechanism is provided for producing relative movement between the drum and the type-wheel carriage immediately before each registration after the workman's first registration in the morning. Inasmuch as the printing carriage is shifted to effect the day-to-day spacing, it is in general simpler and more convenient to shift the impression drum to effect the arrival-and-departure, or the "in-and-out" spacing, and accordingly this plan is the one adopted in the machine illustrated.

Having thus explained in a general way the construction and operation of the invention as exemplified in its preferred embodiment I shall now proceed to describe the construction and operation in detail.

*The mechanism for shifting the printing carriage.*—The supporting frame M has connected to it a band 25, extending rearwardly over an idler 26 at the rear of the machine, and forwardly over a spring-driven actuating drum 27 at the front. This actuating drum constantly tends to rotate in the clockwise direction (as viewed in Fig. 1) and hence if unrestrained would draw the carriage forward on the supporting rail N. Rigidly attached to the driving or shifting drum is a gear 28 (see Fig. 7) meshing with a gear 29 on a vertical shaft 30 which carries at its bottom a stop-disk 31, the latter being mounted on a sleeve 32 provided with a vertical slot 33 engaging a pin 34 on the shaft, thus causing the disk and shaft to rotate together under the influence of the spring $27^a$ which actuates the drum 27 but permitting the disk to be depressed on the shaft against the tension of an elevating spring 35. The disk is provided at its periphery with one or more upwardly extending stops, 36, three such stops being employed in the machine illustrated, and adjacent to the disk is a rotatable escapement device 37 arranged with its periphery in the path of the stops 36. This escapement device (see Figs. 6, 7, and 19) is composed of two disks $37^a$, $37^b$, arranged side by side on a horizontal shaft 38, to which the disk $37^b$ is rigidly attached and which is connected with the clock in such manner as to be rotated thereby through one complete revolution each day. The disk $37^a$ is loose on the shaft, but is provided with a pin 39 extending through an arc-shaped slot 40 in the other disk and yieldingly connected with the disk $37^b$ by a light spring 41. Each disk is provided at its periphery with a notch (shown in Figs. 7 and 19 but unnumbered to avoid confusing the figures) large enough to permit the passage of the stops 36 when in register therewith, the two notches being so located on their disks as to be out of register when the latter are in the relative positions shown in Fig. 19. Remembering now that the shaft makes one complete revolution every day it will be seen that once in each day the notch on the loosely mounted disk $37^a$ will be brought into register with one of the stops 36, normally held against an unnotched portion of the said disk by the force of the spring $27^a$. The stop immediately flies into the notch, but is arrested by the escapement disk $37^b$, whose notch, it will be remembered, is normally out of register with the other. The stop now holds the loose disk $37^a$ against further rotation, but the rigidly mounted disk $37^b$ continues to turn, (extending the spring 41), until the escapement notch on the disk $37^b$ is in register with the other, whereupon the stop flies past the disk $37^b$, and the driving drum 27, thus permitted to turn, advances the printing carriage. Instantly after the passage of the released stop 36 the spring 41 separates the notches on the escapement disks, so that by the time the next stop 36 reaches the escapement device it encounters the periphery of disk 37ª and is arrested thereby, thus stopping disk 31, driving drum 27, and the printing carriage K.

As previously stated, the release of the stop disk 31 takes place once each day, and as three stops 36 are provided, permitting the disk to make a third of a revolution at each release, the disk 31, gears 29, 28, and driving drum 27 are so proportioned that the resulting movement of the printing carriage will be just equal in extent to the width of a day-column on the record sheet.

The hour at which the release of the stop disk 31 and the resulting adjustment of the printing carriage take place is of course the hour at which the escapement notches reach their lowermost position. In order to make this occur at any instant desired the shaft 38 is capable of axial movement in its bearings to disengage its driving gear 42 (see Fig. 1) from the clock-movement to permit the shaft and the escapement device to be turned independently of the clock. To enable the adjustment to be effected more conveniently the shaft 38 may be provided with an indicating disk 43 bearing on its periphery the hour-numbers 1, 2, ... 12, 1, 2, ... 12.

At the end of the week, when work is stopped, the printing carriage stands over the Saturday column on the record sheet, and is then retracted manually to the Monday position. This movement of the carriage winds up the spring 27ª, and of course rotates the stop-disk 31 in the reverse direction. To permit such reverse rotation the stops 36 have their rear edges inclined so that as they engage the escapement disk 37ᵇ they will be cammed downwardly and under the disk against the spring 35.

*The time-printing wheels.*—These devices, designated by 44, are mounted in the carriage K, and are rotated by a clock-driven shaft 45 which is of polygonal cross section so as to transmit motion to the parts but permit the shifting of the carriage as before described. Between the time-printing devices and the record sheet is an ink ribbon 46, wound on two spools mounted on opposite sides of the carriage, one of said spools being shown at 47. The precise construction and arrangement of the time-printing devices is immaterial, and as devices of the general type indicated are well known in the art further explanation is deemed unnecessary.

*Mechanism for depressing the time-printing devices to effect the printing.*—The shaft D, on which the printing drum J is mounted, is tubular at its forward end, as shown in Fig. 4, and in this tubular portion is a reciprocatory plunger 47 the front end of which is loosely engaged by the lever F. At the rear of the tubular portion, just inside the casing A, the shaft D carries an axially movable collar 48 connected to the plunger 47 by a transverse pin 49 extending through slots 50 (Figs. 4 and 5) in the sides of the shaft D. It will therefore be seen that when the plunger is moved inwardly by the actuation of the printing lever the collar 48 will be moved toward the rear on the shaft D. In its inward movement this collar engages the lower end of a lever 50, fulcrumed on trunnions 51, and having its upper part circular in form, as shown in Figs. 5 and 7, to accommodate the clock-driven shaft 45. At its upper end the lever 51 is provided with an adjustable stud 52 in position to engage the depending end of a right-angled arm or lever 53, the rearwardly extending horizontal portion of which overhangs a long narrow rearwardly extending frame 54, pivoted at its ends (one of the pivots being shown at 54ª) and having its inner edge lying over the vertically movable time-printing devices K. A strong spring 55, connected to a laterally extending arm 55ª, serves to hold the frame normally with its inner edge raised. It will now be seen that when the finger 53 is actuated by the lever 50 the inner edge of the frame 54 will be depressed, thereby depressing the time-printing devices K in whatever position the latter may happen to be on the supporting rail N. Upon release of the operating lever F the frame 54 is restored to its initial position by the spring 55, and the printing devices are again raised by a spring 56 (Fig. 1) suitably connected thereto.

Mounted on the pivot 54ª is a horizontal lever 57, carrying a pin 58 overhanging the arm 55ª, so that as this arm is raised by the movement of the finger 53, the outer end of the lever 57 will be raised, bringing a pivoted finger 60 (Fig. 18) into engagement with an actuating stud 61 on the pivotally mounted clapper or hammer 62 and swinging the latter away from the gong 63 against the tension of a spring 64. Just as the finger 60 reaches the upper limit of its movement, at the instant the time-printing devices strike the record sheet, the stud 60 escapes the finger, releasing the clapper and allowing the same to be thrown against the gong by the spring 64. As the finger descends with the arm 57 it swings idly past the stud 60 to its initial position.

*The devices for preventing advancement of the printing carriage until after the first registration on Monday.*—As previously stated, the stop-disk 31, which controls the daily movement of the printing carriage, is released each day. Hence, if there are only six day columns on the record sheet the Sunday release of the stop-disk would shift the carriage off the Monday column and on to the Tuesday column. To prevent this occurrence the carriage-supporting frame M is provided with a catch 65 having a beveled lower face, and on the frame 54, which, it will be remembered, is the element which depresses the carriage, is a coöperating stud 66 having a beveled top, as shown in Fig. 9. Now when the carriage is retracted to the Monday position and slightly beyond, the beveled faces of the parts named coöperate to depress the frame 54 and thus permit the catch 65 to pass over the stud 66. Being thus held by the stop or stud 66 the printing carriage cannot advance when the stop-disk is released by the escapement on Saturday and Sunday; but when the first workman to arrive on Monday actuates the printing lever F to record his time of arrival the depression of the frame 54, as previously described, releases the catch 65 and allows the carriage to move forward until arrested, over the Monday column, by one of the stops 36 engaging the escapement device 37. Thereafter each release of the stop-disk 31 will cause the carriage to move forward to the next day-column.

*Mechanism for shifting the impression drum to effect the "in and out" spacing.*— The collar 48, which, it will be remembered, is slid rearwardly on the shaft D by the manipulation of the operating lever F, is formed with a circumferential groove 48ª engaged by the forked end of a downwardly extending lever 70, so that as the collar moves toward the rear the lower end of the lever just mentioned will be thrown forward, thereby advancing the link 71 to which said end of the lever is connected. This link is connected at its rear end to a second forked lever 72 (see Fig. 3) fulcrumed on a rearwardly extending arm 73 and engaging with its forked upper end a circumferential groove 74 on the forward end of the axially adjustable printing drum. It will therefore be seen that as the link 71 is advanced by the operating lever F through the instrumentality of the connecting parts the lever 72 will be actuated and will slide the impression drum rearwardly under the printing devices. The link 71 is of the telescoping construction shown in Fig. 3, and the parts are connected by a coil spring 71ª, so that although the link must move as a unit toward the rear it is capable of stretching or elongation, as it were, in its forward movement if the lever 72 be held.

Associated with the arm 73 and lever 72 is a bar 75, having a horizontal portion 76 mounted by means of a longitudinal slot 77 and stud 77ª on a short standard 78 so as to be capable of longitudinal movement, and having a downwardly and rearwardly extending portion 79 provided with a horizontal slot 80 by which it loosely engages a stud 81 on the lower portion of the drum-shifting lever 72 below the fulcrum thereof. The lever 70, which actuates the link 71, is normally held in the position shown in Fig. 4 by a strong spring 82, with the lever 72 as in Fig. 3, with the bar 75 in its rearmost position, and with the printing drum in its most advanced position.

Pivoted by its upper end to the lever 72 at a point between the fulcrum thereof and the point of attachment of the bar 75 is a depending yoke 83, the forwardly turned lower end of which is connected to the short downwardly extending portion of a bent finger 84, pivoted at its bend to the lever 72 and having a long horizontal portion 85 extending forwardly toward an arc-shaped stop-member having a row of stops or teeth 86, these stops being arranged in the arc of a circle whose center is the fulcrum of the lever 72, on the arm 73. On the yoke 80 is a lateral ear 87, in which is mounted a stop-screw 88 adapted to bear on the rear end of the bar 75—79, being held in such position by a spring 89 connected with the yoke and the lever 72. It will now be apparent that, with the parts in their initial positions (Fig. 3), the forward movement of link 71 will, in actuating the lever 72, swing the finger 85 upwardly and forwardly past the stops 86 unless said finger be depressed so as to encounter one of the stops; and that the finger will be so depressed if the adjusting yoke 83 be swung toward the rear. It will also be apparent that, inasmuch as the yoke and lever are connected by the spring 89, which also holds the stop-screw 88 in contact with the bar 75—79, the first effect of the forward movement of lever 72 will be to advance the said bar, and that if the bar encounters no resistance sufficient to overcome the tension of the spring 89 the adjusting yoke will not be swung to the rear and consequently the finger 85 will not be depressed and hence will continue to pass over the stops 86 until the bar 75—79 is arrested, whereupon continued movement of the lever 72 serves to throw down the stop-finger 85 into position to engage one of the said stops. As soon as the parts last named come into engagement (for example as in Fig. 12) the lever 72 is arrested, and with it the printing drum which had previously been sliding rearwardly on the shaft D. Further movement of the lever 70 (Fig. 3) now simply separates the telescoping parts of the link 71 against the tension of the spring 71ª. For the purpose of thus arresting the bar 75—76—79 to depress the stop-finger 85 into position to engage a selected stop 86, the following instrumentalities are provided: Surrounding the shaft D in front of the impression drum is a circular series or crown of axially extending ratchet pins 95, (see Figs. 3, 4, 8 and 12), slidably mounted in notches in the periphery of a pair of spaced disks 96, 97, rigidly mounted on the said shaft, the number of pins provided being equal to the number of horizontal spaces on the record sheet carried by the impression drum and each pin being alined with one of said spaces. Just inside the disk 96 and rigidly connected thereto is a disk 98 having a beveled edge engaging one or another of the forwardly extending teeth on the inner edge of each of the ratchet pins; from which fact the disk 98 may be conveniently termed the pawl disk. The pins are all held yieldingly against the edge of the pawl disk by spring tongues 99 on a spring band 100 encircling the pins, so that the forward portion of each pin can be swung radially outward from engagement with the pawl disk to permit forward movement of the pin. In front of the supporting disk 97 each pin has an inwardly extending lug 101 to limit the rearward movement of the pin, and at the rear end is a similar lug 102 to limit the forward movement of the pin unless sooner arrested by the pawl disk, or by the returning-disk, hereafter described.

Extending upwardly from the arresting bar 75 is an adjustably mounted finger 103, below and in the same vertical plane as the axis of shaft D, the finger being so adjusted on the bar as to lie immediately in rear of the lowermost pin of the crown. It will therefore be seen that this lowermost pin, whichever it may happen to be as the operating lever F is swung around over the dial, stands in the path of the finger 103 in position to engage the same and thus arrest the bar 75, with consequent depression of the stop finger 85 as previously described. It will also be apparent that the point at which the bar is arrested, and, in consequence, the particular one of the stops 86 engaged by the stop-finger and therefore the extent of the rearward adjustment of the impression drum, depends upon the position of the lowermost ratchet pin—whether in its initial position, as in Figs. 3 and 14, or advanced one or more steps, as in Fig. 16, for example.

For the purpose of advancing the ratchet pins, to select the stop to be engaged by the stop-finger 88, the following devices are provided: Pivoted to the inner end of the arm 57, which it will be remembered, moves with the frame 54 in the printing operation, is a downwardly extending rod 104 (Figs. 4, 7, 12, and 14 to 17) which is depressed each time the said frame is actuated. This rod has its lower end bent toward the rear into juxtaposition to the pin-supporting disk 96 and terminating just above the lowermost pin of the crown, so that at each downward movement of the rod the lowermost ratchet pin will be carried by the rod radially outward, out of engagement with the pawl disk 98, as in Fig. 15, for example. At this time the finger 103 on the forwardly moving bar 75 strikes the pin 95 (Fig. 15) and having carried the pin forward far enough for the tooth previously in engagement with the pawl disk 98 to clear the same, would advance the pin farther but for the fact that the latter comes immediately into engagement, on its foremost tooth, with the pointed end of the rod 104, which acts as a pawl and holds the pin against further movement. The arresting bar 75 is thus brought to rest, the stop-finger 85 (Fig. 3) is depressed into engagement with the lowermost or first of the stop-teeth 86, and the impression drum is arrested, having been moved forwardly just far enough to carry past the impression point the right-hand or rearward ruling of the day column over which the printing carriage happened to be standing. The impression is now made by the continued downward movement of the printing carriage under the printing or carriage-depressing frame 54. Upon the release of the lever F by the operator, the bar 75 and the connected parts are restored by the spring 82 (Fig. 4) to their initial positions, shown in Fig. 3, and the rod 104 is lifted out of engagement with the depressed ratchet pin; whereupon the spring tongue 100 carries the pin back into engagement with the pawl disk, but on the fourth tooth (from the left) of the pin instead of the third, since, as will be remembered, the finger 103 previously advanced the pin till its third tooth was clear of the disk.

Suppose now that the workman having arrived late, wants to obliterate or render illegible the record just made, or that he desires to register "out" on leaving for his noon meal. Grasping the operating handle or lever F he turns it to his number. This again brings his ratchet pin to the bottom of the crown, in front of the pin-advancing finger 103. On pushing the handle in, the drum-arresting bar 75 is advanced as before described, but the finger 103 does not immediately strike the ratchet pin because the latter has already been advanced one step by his previous operation of the machine. On the contrary the finger 103 and bar 75 have to move farther to engage the pin, and, having engaged the latter, have to move still farther before the pin is arrested by the rod 104 engaging the second tooth on the pin. Consequently the impression drum is moved farther to the rear, carrying the first imprint past the impression point and bringing the next blank space under the time-printing devices. It will therefore be seen that it is impossible for the operator, either by accident or by design, to register more than once on each space, since the drum is automatically advanced one step prior to each imprint.

*Mechanism for restoring the ratchet pins to their initial positions.*—It is evident that after the workmen have all recorded their last "out" for the day and before the first arrival the next morning the ratchet pins should be returned to their initial positions, as shown in Fig. 3. This is effected as follows: In front of the circular series or crown of pins, 10, is a collar or sleeve 110, (Fig. 4) mounted loosely on the shaft D so as to be capable of moving axially thereon but without turning with the shaft, and mounted rigidly on the sleeve is a pin-returning disk 111 having an inclined rim 112 on its rear face, in position to engage the front ends of the pins and carry them back past the pawl disk when the sleeve is shifted to the rear on the shaft D; the inclined cam rim 112 serving to hold the pins clear of the pawl disk 98 during their rearward movement, as shown in Fig. 17. Extending forwardly from the sleeve 110 is a link 113 connected at its front end to a crank disk 114 (Fig. 5) on one end of a short transverse shaft 115. On the other end of this shaft is a gear 116, meshing with a larger gear 117 on the vertical shaft 30, which, it will be remembered, makes a third of a revolution each day. The ratio of the gears just mentioned is 1:3, so that the gear 116 will make one revolution each day. It will therefore be seen that once a day the disk 111 will be slid back against the ratchet pins and will carry the latter rearwardly to their initial positions. It is of course understood that the parts are so arranged that the return of the ratchet pins to their initial positions will take place long enough after the close of work on the one day and long enough before the beginnig of work on the following day to keep the disk 111 well out of the work of the pins during working hours.

*Mechanism for preventing injury to the time-printing devices by careless or rough usage in operating the machine.*—Resting loosely in the fork of lever 70 is a short horizontally arranged member 120 (Fig. 10), having a lug 121 extending upwardly into the groove 48ª. The rear portion of this member rests on the tapering upper end of a pin or stud 122 and has on its lower edge, in front of said stud, a downwardly extending cam lug 123. Now if the operating lever F is manipulated without undue violence the lug 123, as the collar 48 moves to the rear, will ride gently over the stud 122, and drop behind the same, permitting the member 120 to pass under the forwardly extending stop 124 and the collar 48 to complete its movement, as shown in dotted lines in Fig. 11. But if the operating lever is actuated too violently the sudden impact of the lug 123 against the stud will throw the member up and cause its notched rear end to engage the stop 124, as shown in Fig. 11 in full lines, thus arresting the collar 48 before it has moved far enough to complete the actuation of the printing devices. Inasmuch as the bell does not ring unless an imprint is made, the operator knows that his registration has not been effected and soon learns that he can register only by gentle handling of the machine.

*Devices for securing the record sheet on the impression drum.*—At one side of the drum, along the line corresponding to the blank space which will be seen at the top of the dial in Fig. 2, the drum is provided with a longitudinal slot 130, (Figs. 21 and 22), opening into a cylindrical casing on the inside of the drum. Fitting smoothly but not snugly in this casing is a tubular clamping member 131, having one side slotted, as shown at 132, and provided at one end with a knob 133 by which the clamping member can be rotated. When it is desired to mount a record sheet on the drum the clamping member is positioned with its slot over the drum slot. The record sheet is now wrapped around the drum and its edges are thrust through the slot 130. The clamping member is then turned, for example counterclockwise, causing the edge of its slot to pull the edges of the sheet over the drum-slot edges and drawing the sheet taut around the drum, as will be readily understood. To release the sheet it is only necessary to turn the slot 132 back into register with the other.

*Operation.*—The function and mode of operation of the various parts having been already explained, a brief summary, to show the order in which the parts operate, will now be sufficient. When the operator desires to register his time of arrival or departure he turns the operating lever F to his number, thereby bringing his line on the record sheet under the time-printing devices, K, and bringing his ratchet pin 95 to the bottom of the crown and in front of the pin-advancing finger 103. He then presses firmly on the knob G, thrusting the stem H into the aperture C corresponding to his number. This movement of the lever F moves the collar 48 rearwardly on the shaft B, thereby depressing the printing devices K and the rod 104 through the instrumentality of the printing frame 54, and swinging the lever 72 clockwise (as viewed in Fig. 1) through the instrumentality of the lever 70. The lever 72 shifts the impression drum J rearwardly until the finger 103 carried into contact with the lowermost ratchet pin, is arrested by the rod 104 engaging the pin. The drum is thus brought to rest. The printing carriage, however, continues its downward movement, and makes a time-imprint on the record sheet mounted on the impression drum. The gong having been rung, the operator releases the handle F, whereupon the carriage is raised and the drum returned to its initial position. At the same time the ratchet pin is left in the position to which is had been advanced by the finger 103, so that at the next operation of the machine by the same workman the drum will be carried past the previous imprint and will thus present an unprinted space to the impression point. Once each day, after the close of work, the stop disk 31 is released by the escapement device 37, permitting the printing carriage to be advanced one day space, and before the beginning of work the next day the ratchet pins which have been advanced one or more steps are restored to initial position by the returning-disk 111. At the end of the week the printing carriage is retracted, manually, on the supporting rail N, causing the catch 65 to be engaged by the stop 66 so that the release of the stop-disk 31 on Sunday will not cause the carriage to be advanced to the Tuesday column on the record sheet. The first registration on Monday releases the carriage and allows it to be advanced when the stop disk is next released.

As previously stated, the construction herein specifically illustrated and described exemplifies the invention in only one of the many forms in which it may be embodied without departure from its proper spirit and scope as defined by the following claims.

I claim:—

1. In a time recorder, the combination with time-recording instrumentalities comprising a time-printing element and an element for supporting a record sheet in position to receive time imprints from the first named element, time-controlled mechanism for shifting one of said elements day by day from its initial position whereby to print the day's records in successive columns on the record sheet, and manually actuated means for taking time-imprints from the time-printing element upon the record sheet, of releasable means for locking said shiftable element in its initial position until a time-imprint is taken.

2. In a time recorder, the combination with time-recording instrumentalities comprising a time-printing element and an element for supporting a record sheet in position to receive time-imprints from the first named element, mechanism for shifting one of said elements day by day from its initial position whereby to print the day's records in successive columns on the record sheet, and manually actuated means for taking the time-imprints from the time-printing element upon the record sheet, of means releasable by the said manually actuated means for locking the said shiftable element in its initial position.

3. In a time recorder, the combination with a time-printing carriage, an element for supporting a record sheet in position to receive time-imprints therefrom, manually actuated means for taking such imprints on a record sheet so supported, and time-controlled mechanism for advancing said carriage day by day from its initial position whereby to print the day's records in successive columns on the record sheet, of releasable means for locking said carriage in its initial position, said means being released, to permit advance of the carriage, by actuation of the said manually actuated imprint-taking means.

4. In a time recorder, in combination, an element for supporting a record sheet, a time-printing carriage movable toward and from said element, a fixed rail slidably supporting the carriage in position to make time-imprints on a record sheet supported by said element, a manually actuated element engaging the carriage to move the same toward the record sheet supporting element to produce the time-imprints, time-controlled mechanism for advancing the carriage on said rail day by day from its initial position whereby to print the day's records in successive columns on the record sheet, and coöperating stops, to lock the carriage in its initial position and releasable by the movement of the carriage toward the record sheet supporting element to produce a time-imprint.

5. In a time recorder, in combination, a record sheet supporting element, a fixed rail extending longitudinally of said element, a time-printing carriage having a portion slidably mounted on said rail and having a portion capable of movement relatively thereto toward and from the record sheet supporting element, a manually actuated element extending along the path of the carriage and engaging the carriage to move the same toward the said element, time-controlled mechanism for advancing the carriage on the rail day by day, a stop mounted on the slidable portion of said carriage, and a coöperating stop mounted on the manually actuated element in position to engage the stop on the carriage when the carriage is in its initial position, the said coöperating stop being released from the other, to permit advance of the carriage, by movement of said manually actuated element to produce a time-imprint.

6. In a time recorder, the combination of a fixed supporting rail, a frame slidably mounted thereon, time-printing devices mounted in the frame and capable of movement therein from and toward the rail, a manually actuated element parallel to the path of the time-printing devices and engaging the latter to move the same away from the rail, time-controlled mechanism for advancing the frame and time-printing devices on the rail day by day from an initial position, a stop mounted on said frame, and a coöperating stop mounted on the manually actuated element in position to engage the first named stop when the frame and time-printing devices are in said initial position, the coöperating stop being releasable from the first by the movement of the said manually actuated element.

7. In a time recorder, the combination of a fixed supporting rail, a frame slidable thereon, a depressible printing carriage mounted in the frame, a cam stop carried by the frame, a manually depressible element engaging the carriage to depress the same, time-controlled mechanism for advancing the frame and carriage on the rail day by day from an initial position, and a coöperating cam stop mounted on the depressible element in position to be cammed by the frame-stop out of the path thereof as the said frame is retracted to its initial position and to engage the said frame-stop thereafter to hold the frame and carriage in their initial position until the stops are disengaged by depression on the said element.

8. In a workman's time recorder, in combination, an element for supporting a record sheet provided with spaces for the time-records of the different workmen, a time-printing element for printing the time-records on the record sheet, means for shifting one of said elements relative to the other past the impression point, a series of ratchet pins one for each workman, to limit the movement of the shiftable element, mechanism associated with said shifting means to advance the appropriate rachet pin a predetermined distance each time a time-record is made, and time-controlled means for restoring the advanced pins to their initial positions.

9. In a workman's time recorder, in combination, a rotatably and axially shiftable drum for supporting a record sheet having axially extending spaces for the time-records of the several workmen, time-printing devices for printing the time-record on the record sheet, a circular series of ratchet pins rotatable with the drum, means for shifting the drum toward said series of pins each time a time-record is made, mechanism associated with and actuated by said means for advancing the appropriate ratchet pin step-by-step, means for arresting the advancing pins at the end of each step to prevent further movement of the drum, and time-controlled mechanism for restoring the advanced pins to their initial positions.

10. In a workman's time recorder, in combination, a rotatable drum for supporting a record sheet having axially extending spaces for the time-records of the several workmen, time-printing devices for printing the time-records on the record-sheet, a manual lever for rotating the drum to bring the said spaces on the record sheet singly to the impression point, means actuated by the said lever for taking impressions from the time-printing devices on the record sheet, mechanism, dependent for operation upon actuation of the last named means, for shifting the drum axially, a circular series of axially arranged ratchet pins rotatable with the drum, a finger advanced by said mechanism to engage and advance the appropriate pin when said mechanism is operated to shift the drum, a pawl for limiting the movement of the advancing pin and finger to arrest the drum, and time-controlled means for restoring the advanced pins to their initial positions.

11. In a time recorder, the combination with time-printing devices, a record sheet supporting drum, manual means for rotating the drum to bring axially extending spaces on the record sheet singly to the impression point, mechanism actuated by said means for taking imprints from the time-printing devices on the record sheet, and means actuated by said mechanism for advancing the drum axially to bring to the impression point unprinted portions of said axially extending spaces on the record sheet; of means for arresting the drum at successive points in its path, comprising a plurality of axially extending ratchet pins arranged in a circular series around the axis of the drum and rotatable therewith, a finger movable with the drum and adapted to engage and advance the appropriate ratchet pin, and a pawl actuated by the imprint-taking mechanism to limit the movement of the advancing pin and finger and thereby arrest the drum; and time-controlled mechanism for restoring the advanced pins to their initial positions.

12. In a time recorder, the combination with a record sheet supporting drum, rotatable to bring axially extending spaces on the record sheet singly to the impression point, and axially to bring to the impression point unprinted portions of said spaces; of means for arresting the drum at successive points in its path, comprising a crown of axially extending ratchet pins in advance of the drum and rotatable therewith, means movable with the drum for engaging and advancing the appropriate pin as the drum is advanced, and a pawl arranged to arrest the advancing pin and finger and thereby arrest the drum; and means for restoring the advanced pins to their initial positions.

13. In a time recorder, in combination for the purpose set forth, a rotatable and axially movable drum for supporting a record sheet, a finger movable with the drum in a path parallel to the axis thereof, a plurality of ratchet pins arranged in a circular series around the axis of the drum and across the path of said finger, the series of pins being rotatable with the drum to carry the pins singly into the path of said finger for advancement thereby, a pawl adapted to engage the advancing pin to arrest the same at successive points in its path, and means for restoring the advanced pins to their initial positions.

14. In a recording machine, a printing couple including two elements having relative shifting movement laterally into successive transverse relative positions, and the elements having relative lateral displacing movement a distance equal to a plurality of the successive lateral shifting movements, shiftable means for determining the successive transverse relative positions of said elements, and means for resetting the first-mentioned means and effecting the relative displacing movement of said elements at one operation, substantially as and for the purpose described.

15. In a recording machine, a printing couple including elements having relative positioning movements into longitudinal and successive transverse positions, said elements also having relative lateral displacing movement a distance equal to a plurality of the relative successive lateral shifting movements in one longitudinal position, means for moving said elements in longitudinal and transverse directions, means for determining the successive transverse relative positions of said elements including a series of successively effective shoulders for each of the relative longitudinal positions assumed by said elements, and means for resetting the position determining means and effecting the relative displacing movement of said elements in one operation, substantially as and for the purpose specified.

16. In a recording machine, a printing couple including an element consisting of rotatable drum for supporting two record sheets side by side on its periphery, and a type carrying element, said elements having relative shifting movement laterally into successive transverse positions, and the elements having relative lateral displacing movement a distance equal to a plurality of the successive lateral shifting movements, means for rotating the drum and shifting the shiftable element laterally, means for determining the successive transverse positions including a series of successively effective shoulders, and means for resetting the position-determining means and for effecting the relative displacing movement of said elements at one operation, substantially as and for the purpose set forth.

17. In a recording machine, a printing couple including elements having relative positioning movements into longitudinal and successive transverse positions, said elements also having relative lateral displacing movement a distance equal to a plurality of the relative successive lateral shifting movements in one longitudinal position, means for moving said elements in longitudinal and transverse directions, means for determining the successive transverse relative positions of said elements including a series of successively effective shoulders for each of the relative longitudinal positions assumed by said elements, and means for resetting the position determining means and effecting the relative displacing movement of said elements in one operation, the last-named means including a motor spring and power-transmitting parts actuated by the spring, and coacting with the position determining means and the laterally displaceable element, substantially as and for the purpose described.

18. In a recording machine, a printing couple including elements having relative positioning movement into longitudinal and successive transverse positions, said elements also having relative lateral displacing movement a distance equal to a plurality of the relative successive shifting movements of said element in any one longitudinal path, means for shifting said elements into longitudinal transverse positions including a handle, means for limiting the relative lateral shifting movement of the elements into successive transverse positions including a series of successively effective shoulders for each of the longitudinal positions assumed by said elements, means for resetting the limiting means and effecting the relative displacing movement of said elements in one operation, said means including a motor, means for normally preventing the resetting means from actuation by the motor, and time controlled means for releasing said holding means, substantially as and for the purpose set forth.

In testimony whereof I affix my signature in the presence of two subscribing witnesses.

JAMES F. KIELY.

Witnesses:
L. F. GIBLIN,
S. H. CHAMBERLAIN.

Copies of this patent may be obtained for five cents each, by addressing the "Commissioner of Patents. Washington, D. C."